United States Patent
Ishii et al.

(10) Patent No.: US 8,238,345 B2
(45) Date of Patent: Aug. 7, 2012

(54) PACKET TRANSMISSION CONTROL DEVICE, AND PACKET TRANSMISSION CONTROL METHOD

(75) Inventors: Hiroyuki Ishii, Yokosuka (JP); Akihito Hanaki, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 743 days.

(21) Appl. No.: 11/911,603

(22) PCT Filed: Apr. 13, 2006

(86) PCT No.: PCT/JP2006/307843
§ 371 (c)(1),
(2), (4) Date: Apr. 15, 2008

(87) PCT Pub. No.: WO2006/112359
PCT Pub. Date: Oct. 26, 2006

(65) Prior Publication Data
US 2009/0067376 A1  Mar. 12, 2009

(30) Foreign Application Priority Data
Apr. 15, 2005  (JP) ................. 2005-119015

(51) Int. Cl.
*H04L 12/28* (2006.01)
*H04W 4/00* (2009.01)
(52) U.S. Cl. ................. 370/395.42; 370/329
(58) Field of Classification Search .......... 370/310–350, 370/413–418, 252, 395.4, 395.42
See application file for complete search history.

(56) References Cited

U.S. PATENT DOCUMENTS

| | | | | |
|---|---|---|---|---|
| 6,937,864 | B2 * | 8/2005 | Koo et al. | 455/452.1 |
| 7,130,295 | B2 * | 10/2006 | Kim et al. | 370/349 |
| 7,394,768 | B2 * | 7/2008 | Pedersen | 370/252 |
| 2003/0095538 | A1 * | 5/2003 | Kayama et al. | 370/350 |
| 2003/0142658 | A1 * | 7/2003 | Ofuji et al. | 370/349 |
| 2004/0002341 | A1 | 1/2004 | Chen | |
| 2004/0120284 | A1 * | 6/2004 | Terry et al. | 370/329 |
| 2004/0120306 | A1 * | 6/2004 | Wigard et al. | 370/349 |
| 2004/0228286 | A1 | 11/2004 | Kim et al. | |

(Continued)

FOREIGN PATENT DOCUMENTS
EP  1 480 474 A2  11/2004

(Continued)

OTHER PUBLICATIONS

Ofuji, Yoshiaki et al., "Performance of Frequency-Domain Scheduling Considering Packet Traffic on OFCDM Wireless Access in Forward Link", IP Radio Network Development Department, NTT DoCoCo., Inc., p. 435, 2004 (with partial English translation).

Holtzman, Jack M. "CDMA Forward Link Waterfilling Power Control", IEEE VTC, pp. 1663-1667, 2000.

(Continued)

*Primary Examiner* — Warner Wong
(74) *Attorney, Agent, or Firm* — Oblon, Spivak, McClelland, Maier & Neustadt, L.L.P.

(57) ABSTRACT

A disclosed packet transmission control apparatus controls packet transmission to plural radio terminals. A priority determination portion determines a packet assignment priority in accordance with at least one of presence/absence of retransmission data and the number of data transmissions. A radio terminal selection portion that selects a radio terminal to be a communications party in accordance with the priority.

13 Claims, 10 Drawing Sheets

U.S. PATENT DOCUMENTS

| | | | |
|---|---|---|---|
| 2005/0002352 A1* | 1/2005 | Bao et al. | 370/328 |
| 2006/0023659 A1* | 2/2006 | Abedi | 370/328 |
| 2010/0118719 A1* | 5/2010 | Ishii et al. | 370/252 |

FOREIGN PATENT DOCUMENTS

| | | |
|---|---|---|
| JP | 3-58646 | 3/1991 |
| JP | 2004-147275 | 5/2004 |
| JP | 2004-312190 | 11/2004 |
| WO | WO 01/76098 A2 | 10/2001 |
| WO | WO 01/76098 A3 | 10/2001 |

OTHER PUBLICATIONS

3$^{rd}$ Generation Partnership Project, "Technical Specification Group Radio Access Network; Physical layer aspects of UTRA High Speed Downling Packet Access", V4.0.0, pp. 1-89, 2001.

3$^{rd}$ Generation Partnership Project 2, "cdma2000 High Rate Packet Data Air Interface Specification", Version 1.0, 2004.

Office Action issued Apr. 26, 2011, in Chinese Patent Application No. 200680012370.0 (with English-language Translation).

* cited by examiner

PACKET TRANSMISSION CONTROL DEVICE, AND PACKET TRANSMISSION CONTROL METHOD

TECHNICAL FIELD

The present invention relates to a packet transmission control apparatus and a packet transmission control method that perform downlink transmission control (scheduling) in a mobile communications system.

BACKGROUND ART

In a downlink of a mobile communications system, a radio base station may share one physical channel between the radio base station and mobile stations belonging to the radio base station. The physical channel used in this case is referred to as a downlink shared channel hereinafter.

In the downlink shared channel, the radio base station controls the order of packet transmissions to plural mobile stations as communications parties in accordance with an instantaneous transmission (radio) quality of each mobile station, thereby enhancing throughput, or so-called system capacity, of the radio base station.

Such transmission order control by the radio base station is call scheduling. It is known that application of such a scheduling to packet data transmission may increase a communications capacity and enhance a communications quality (see non-patent document 1). The scheduling is based generally on the premise that requirements for packet data handled by the scheduling are not very strict in terms of transmission latency.

By the way, regarding standardization of the third generation mobile system, also known as IMT-2000, 3GPP (Third Generation Partnership Project) and 3GPP2 (Third Generation Partnership Project 2) organized by provincial standardization facilities have formulated standard specifications related to W-CDMA and cdma 2000, respectively.

3GPP has standardized "High Speed Downlink Packet Access (HSDPA)", which is a high speed downlink packet transmission method, in anticipation of an increase in high speed and high volume traffic by downloading or the like from data bases or Web sites through downlink (see non-patent document 2, for example).

In addition, 3GPP2 has standardized "1x-EVDO", which is a downlink high speed data only transmission method, from the same point of view (see non-patent document 3) Here, "DO" is an abbreviation of "data only" in the cdma 2000 1xEV-DO.

HSDPA combines control of radio channel modulation methods and coding rates in accordance with transmission (radio) quality between a mobile station and a radio base station, such as Adaptive Modulation and Coding Scheme (AMCS), and scheduling performed in units of a few milliseconds, thereby enhancing throughput for each user and throughput for a system as a whole.

When it comes to a scheduling algorithm that controls the transmission order of packets waiting to be transmitted in a radio base station, round robin scheduling has been well known, in which the downlink shared channel is allocated to mobile stations belonging to the radio base station by turns (for example, in an order of mobile stations #1->#2->#3).

In addition, there have been known MAX C/I (Maximum C/I) and Proportional Fairness scheduling in which the transmission order of the packets waiting to be transmitted is controlled in accordance with a transmission quality and an average transmission quality of each mobile station.

An example of the control method based on the general Proportional Fairness scheduling will be described.

Proportional Fairness is a scheduling algorithm that can perform allocations responsive to an instantaneous change in downlink transmission quality of each mobile station while assuring fairness between mobile stations.

Referring to FIG. 1, a Proportional Fairness scheduler is described. FIG. 1 is a flowchart indicating operations of the Proportional Fairness scheduler. In this scheduling algorithm, an average transmission quality and a transmission quality of each mobile station are measured as elements of an evaluation function; the evaluation function is obtained for each mobile station belonging to the radio base station; and to the mobile station having the largest evaluation function is allocated the downlink shared channel. By the way, an average transmission rate is used as an example of the average transmission quality in the following.

In FIG. 1, initial values are determined at step S41 as follows.

[Initial Values]
n=1 (n: mobile station suffix)
$C_{max}=0$ ($C_{max}$: the maximum value of the evaluation function)
$n_{max}=0$ ($n_{max}$: the mobile station having the maximum value of the evaluation function)

Then, elements necessary to calculate the evaluation function, specifically, (1) the transmission quality of each mobile station, (2) an average transmission rate, are measured at step S42. Next, the evaluation function $C_n$ is calculated using the measured values obtained at step S42.

$$C_n = \frac{R_n}{\overline{R_n}}$$

$R_n$: instantaneous radio quality of mobile station n
$\overline{R_n}$: average transmission rate of mobile station n Then, it is determined at step S44 whether the calculated evaluation function $C_n$ obtained at step S43 exceeds the $C_{max}$. Since $C_{max}$ is zero in this case, the determination made at step S44 is YES; the value of $C_n$ calculated at step S43 is set to $C_{max}$; and $n_{max}$ is set to 1.

Next, n is incremented at step S46 and the values of the evaluation function are obtained by turn for the mobile stations communicating with the radio base station by a loop process at step S47. Then, the mobile station having the largest evaluation function is selected and to this mobile station is allocated the downlink shared channel.

Since the Proportional Fairness scheduler allocates the downlink shared channel to a mobile station having relatively better transmission quality, a higher throughput is expected compared with the round-robin scheduling.

In addition, since the instantaneous transmission quality is divided by the average transmission rate in each mobile station, the evaluation function value is reduced in the mobile stations having a higher average transmission rate, thereby realizing allocations with high temporal fairness.

Moreover, in packet transmission in a packet network, it is now under consideration that two priority classes are to be provided and packets having a first priority are to be preferentially transmitted compared with packets having a second priority (see patent-related document 1, for example).

However, in the Proportional Fairness scheduler, it is difficult to control packet allocation depending on whether a mobile station concerned has retransmission data.

Since it is difficult to control the packet allocation depending on whether a mobile station concerned has retransmission data, there may be a case where packets are not assigned to the retransmission data. When the retransmission data remain in a lower layer, there is caused a delay in upper layers, such as an RLC layer and a TCP layer, or the retransmission data may be discarded after a predetermined time period measured by a discard timer. Therefore, there is a disadvantage in that an error rate becomes higher in the upper layers as a result.

Furthermore, when packet transmissions are performed in accordance with the priority class, packet allocation is required in which the priority class and presence/absence of the retransmission data are both taken account of. However, it is difficult in the case of the Proportional Fairness scheduler to take account of the priority class and the presence/absence of retransmission data when controlling the packet allocation.

By the way, data are considered to be retransmission data when the data have been mapped at least once in the HS-DSCH and transmitted to a mobile station concerned, when Ack for the data is not received from the mobile station through the uplink HSDPA control channel HS-DPCCH, and when elapsed time from the previous transmission becomes a predetermined time or more.

Non-patent Publication 1: J. M. Holtzman, IEEE VTC2000, Spring
Non-patent Publication 2: 3GPP TR25.848 v. 4.0.0
Non-patent Publication 2: 3GPP C.S0024 Rev. 1.0.0
Patent-related Publication 1: Japanese Patent Application Laid-Open Publication No. H03-58646.

SUMMARY OF INVENTION

Problem to be Solved by the Invention

However, the aforementioned related art has the following disadvantages.

As one of scheduling algorithms that determine an order of packet transmissions of packets waiting to be transmitted in the radio base station, there is the Proportional Fairness scheduling.

However, there is a disadvantage in the Proportional Fairness scheduling algorithm in that it is difficult to control packet allocation depending on whether a mobile station concerned has retransmission data.

In addition, there is also a disadvantage in the Proportional Fairness scheduler in that it is difficult to take account of the priority class and the presence/absence of the retransmission data when controlling the packet allocation.

The present invention has been made in view of the above, and the objective thereof is to provide a packet transmission control apparatus and a packet transmission control method that are capable of performing packet allocations by taking account of at least one of the number of data transmissions and presence/absence of retransmission data.

Means for Solving the Problem

In order to eliminate the above disadvantages, a packet transmission control apparatus according to an embodiment of the present invention includes a priority determination portion that determines a packet assignment priority in accordance with at least one of presence/absence of retransmission data and the number of data transmissions; and a radio terminal selection portion that selects a radio terminal to be a communications party in accordance with the priority.

According to the above configuration, the packet transmission is controlled in accordance with at least one of the presence/absence of retransmission data and the number of data transmissions.

In addition, a packet transmission control method according to an embodiment of the present invention controls packet transmission to plural radio terminals, which includes determining at least one of presence/absence of retransmission data and the number of data transmissions for each of the radio terminals; determining a packet assignment priority in accordance with the presence/absence of retransmission data; and selecting a radio terminal to be a communications party in accordance with the packet assignment priority.

According to the above method, a radio terminal is selected to be a communications party in accordance with at least one of the presence/absence of retransmission data and the number of data transmissions, and packet transmission is controlled accordingly.

Advantage of the Invention

According to an embodiment of the present invention, a packet transmission control apparatus and a packet transmission control method that are capable of performing packet allocations by taking account of at least one of the number of data transmissions and presence/absence of retransmission data are provided.

LIST OF REFERENCE SYMBOLS

Figure 1:
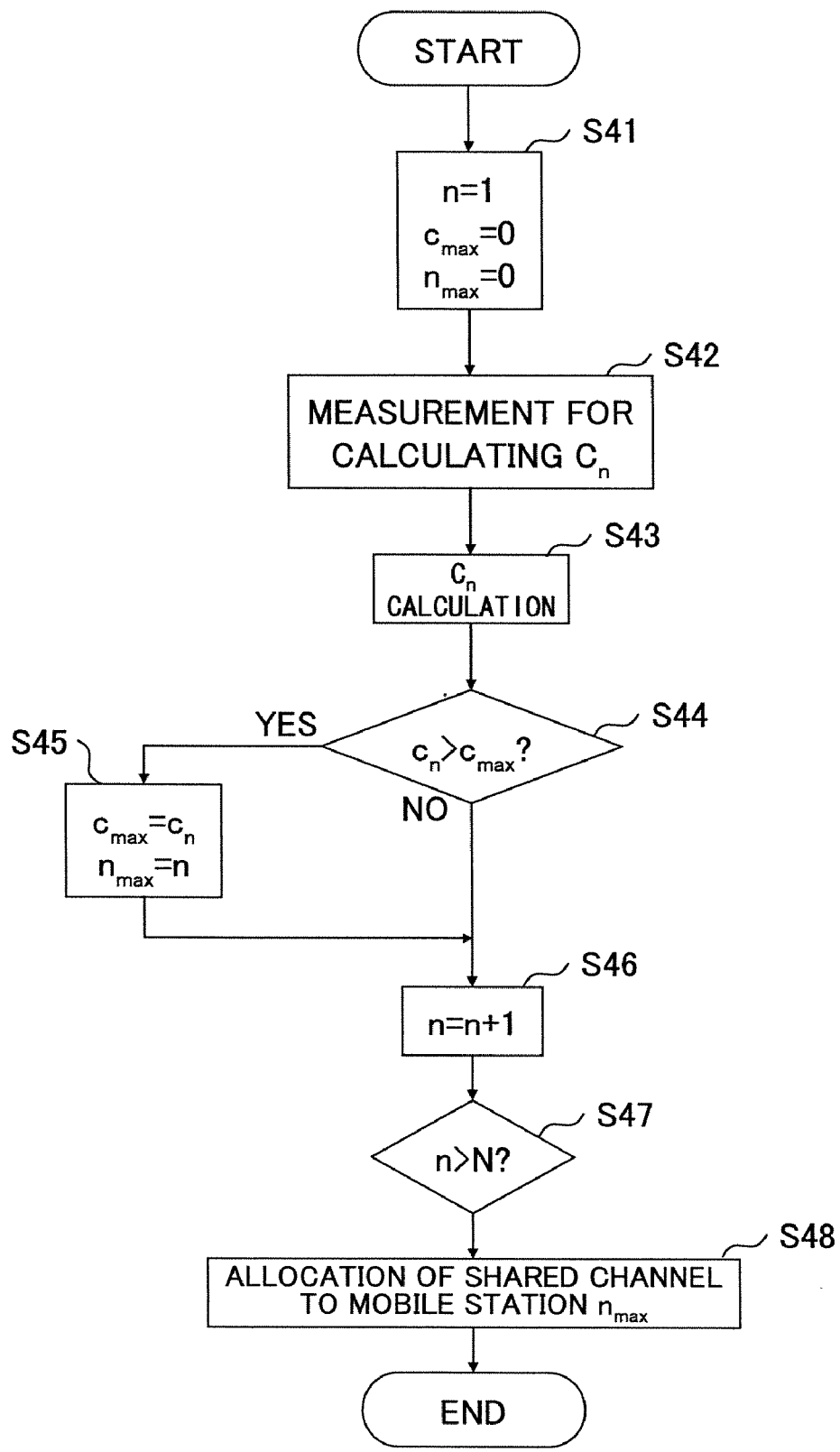
FIG. 1 is a flowchart illustrating operations of a scheduling algorithm.

10, 11, 12: mobile station
100: radio base station

BEST MODE FOR CARRYING OUT THE INVENTION

Referring to the accompanying drawings, best modes for practicing the present invention will be described in accordance with the following examples.

By the way, like reference marks are given to elements having the like function in all the drawing for the purpose of illustration, and undue repetition of explanations thereof are omitted.

Figure 2:
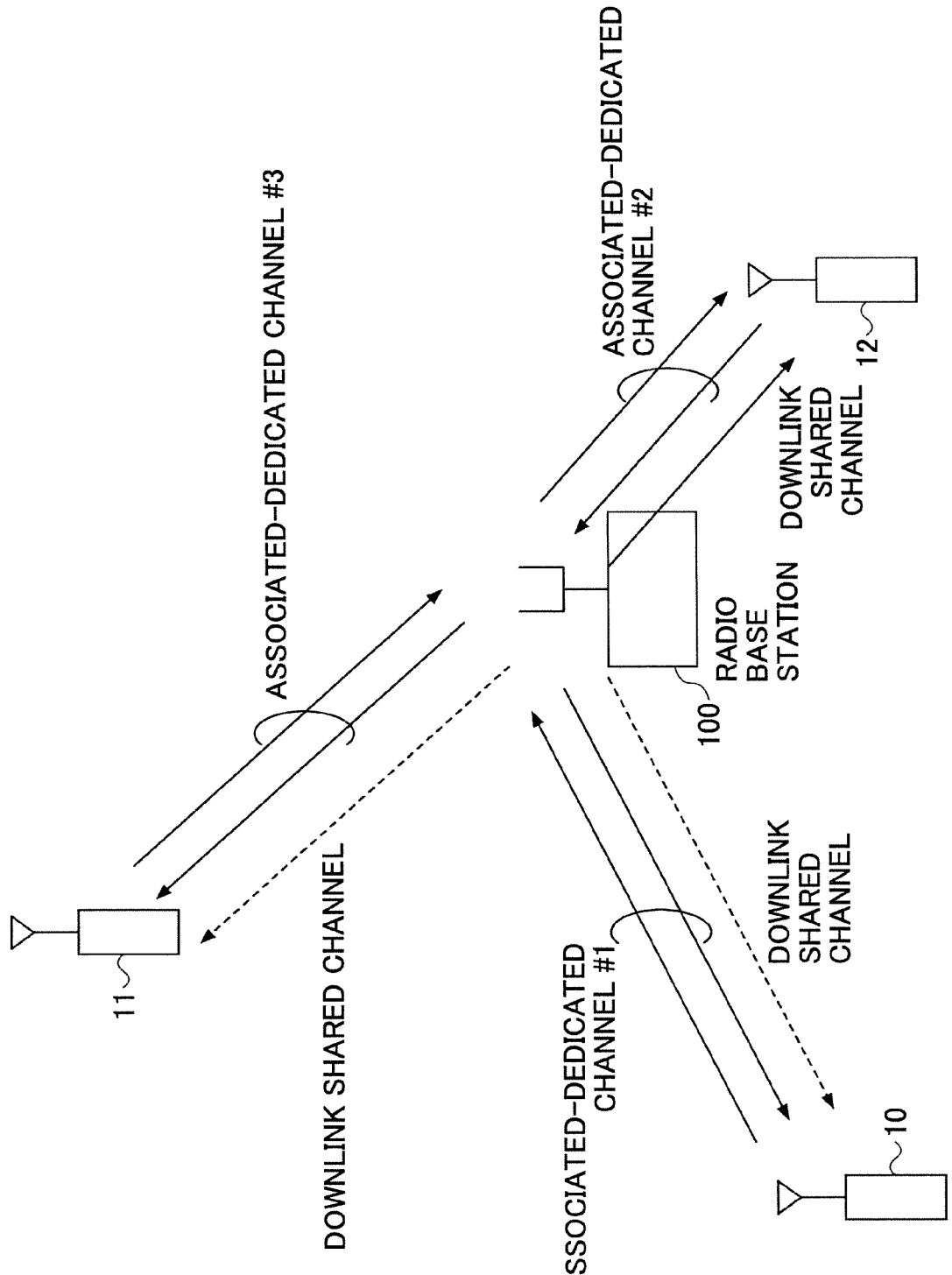
FIG. 2 is a schematic view illustrating a mobile communications system according to an example of the present invention.

Referring to FIG. 2, a mobile communications system according to an example of the present invention is described.

The mobile communications system according to this example includes a radio base station 100 and plural mobile stations 10, 11, 12. The radio base station 100 and the plural mobile stations 10, 11, 12 perform, for example, HSDPA-based communications.

In a downlink packet transmission in the HSDPA, a High Speed-Physical Downlink Shared Channel (HS-PDSCH), a High Speed-Shared Control Channel (HS-SCCH), and Associated-Dedicated Physical Channels (A-DPCH) #1, #2, #3 (two-way channel) associated with the shared physical channel are used.

The downlink shared physical channel HS-PDSCH is shared by the mobile stations 10, 11, 12 and the corresponding transport channel is called a High Speed-Downlink Shared Channel (HS-DSCH).

The downlink shared control channel HS-SCCH is shared by the mobile stations 10, 11, 12.

An associated dedicated channel A-DPCH is allocated to each mobile station 10, 11, 12.

In addition, a High Speed-Dedicated Physical Control Channel (HS-DPCCH) allocated to each mobile station 10, 11, 12 is used in uplink.

In uplink, a pilot symbol and a transmission power control command (TPC) for the downlink associated-dedicated channel transmission, in addition to user data, are transmitted through the A-DPCH #1, #2, #3.

In addition, shared channel scheduling, downlink quality information for use in the Adaptive Modulation and Coding Scheme (AMCS), namely, a Channel Quality Indicator (CQI), and transmission acknowledgement information, namely Ack/Nack, are transmitted through the control channel HS-DPCCH for HSDPA.

On the other hand, in downlink, the TCP command for the uplink associated-dedicated channel or the like is transmitted through the associated-dedicated channels #1, #2, #3 and user data are transmitted through the shared physical channel.

The mobile stations 10, 11, 12 have the same configuration and function. Therefore, they are each mentioned as a mobile station n (n: positive integer excluding zero) unless otherwise noted.

Figure 3:
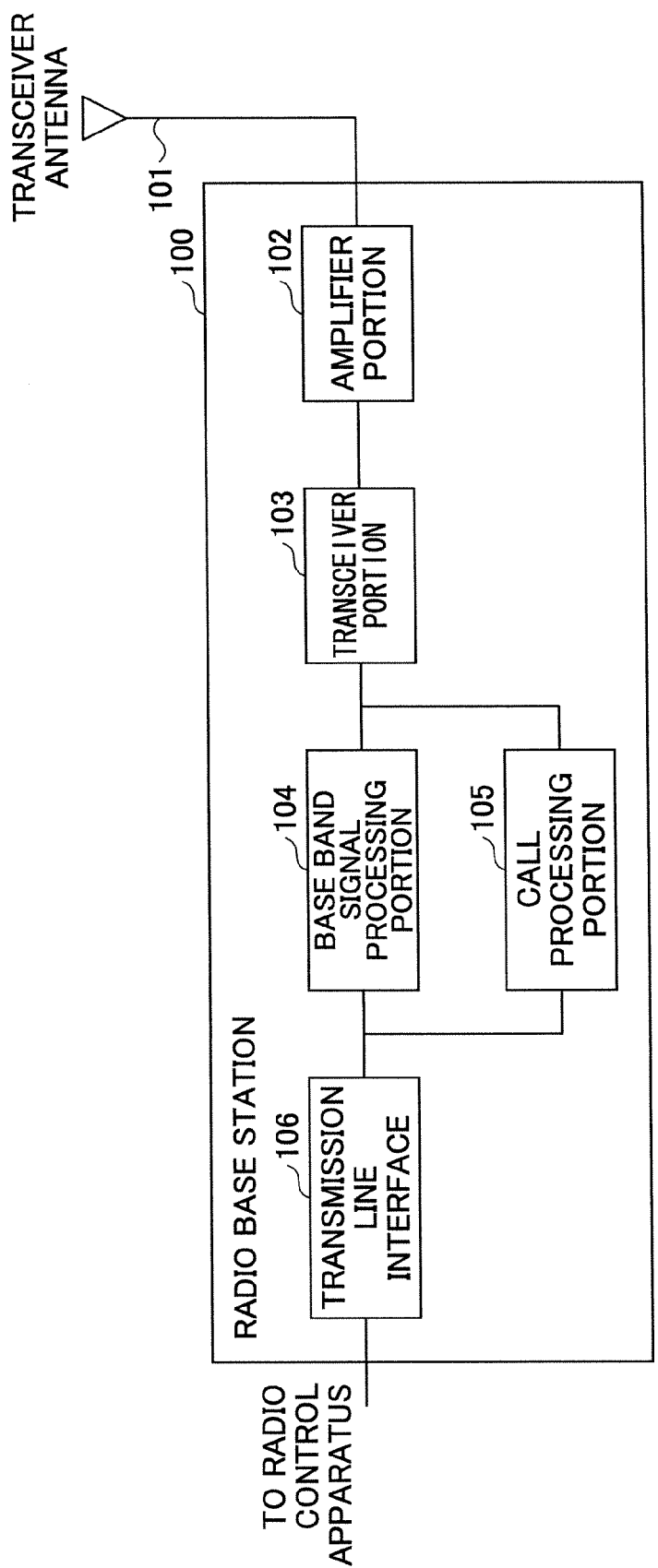
FIG. 3 is a block diagram illustrating a radio base station according to an example of the present invention.

Next, referring to FIG. 3, the radio base station 100 according to a first example is described.

The radio base station 100 according to the this example includes a transceiver antenna 101, an amplifier portion 102 connected to the transceiver antenna 101, a transceiver portion 103 connected to the amplifier portion 102, a base band signal processing portion 104 and a call processing portion 105, both of which are connected to the transceiver portion 103, and a transmission line interface 106 connected to the base band signal processing portion 104 and the call processing portion 105.

Downlink packet data are input to the base band signal processing portion 104 from a radio control apparatus positioned at an upper level of the radio base station 100 via the transmission line interface 106. In the base band processing portion 104, the downlink packet data undergo a retransmission controlling process (Hybrid ARQ (H-ARQ)), scheduling, transmission format selection, coding, and spreading, and are converted into a base band signal, which in turn is input to the transceiver portion 103.

In the transceiver portion 103, the base band signal input from the base band signal processing portion 104 undergoes a frequency conversion process that converts the signal into a frequency band signal and is input to the amplifier portion 102. The amplifier portion 102 amplifies the frequency-converted base band signal and transmits the amplified signal from the transceiver antenna 101.

On the other hand, uplink data (radio frequency signals) are received by the transceiver antenna 101, amplified by the amplifier portion 102, and frequency-converted into a base band signal by the transceiver portion 103. This base band signal undergoes despreading, RAKE-combining, and error correction decoding and then is forwarded to the radio control apparatus via the transmission line interface 106.

The call processing portion 105 transmits and receives a call processing control signal to and from the radio control apparatus, controls the quality of the radio base station 100, and allocates resources.

Figure 4:
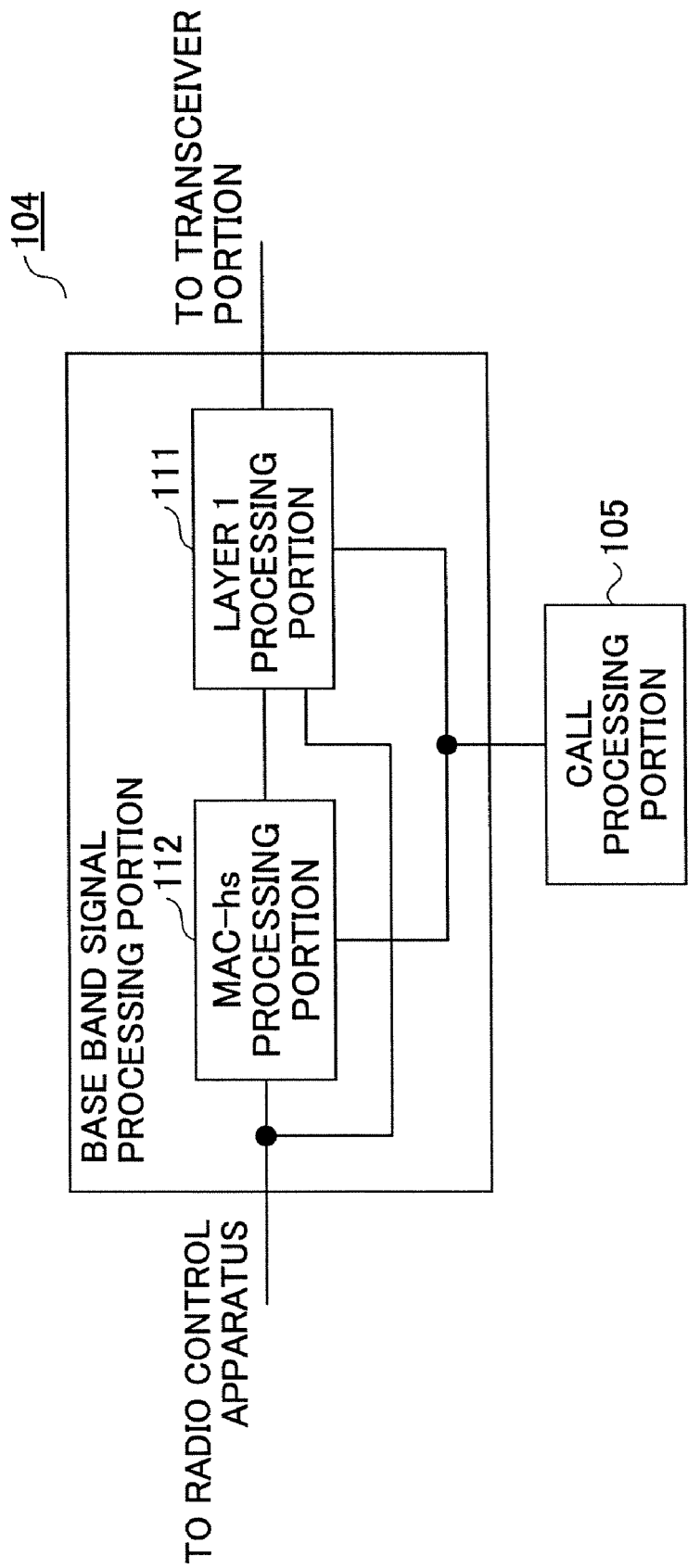
FIG. 4 is a block diagram illustrating a base band signal processing portion of the radio base station according to the example of the present invention.

Next, the base band signal processing portion 104 is described in reference to FIG. 4.

The base band signal processing portion 104 includes a layer 1 processing portion 111 connected to the transceiver portion 103, the call processing portion 105, and the transmission line interface 106, and a Medium Access Control-HSDPA (MAC-hs) processing portion 112 connected to the layer 1 processing portion 111. The MAC-hs processing portion 112 is connected to the transmission line interface 106 and the call processing portion 105.

The layer 1 processing portion 111 performs downlink data channel encoding, uplink data channel decoding, transmission power controls in uplink and downlink dedicated channels, RAKE combining, and spreading/despreading processes.

The MAC-hs processing portion 112 performs Hybrid ARQ (HARQ) of the downlink shared channel in HSDPA and scheduling for the packets waiting to be transmitted.

Figure 5:
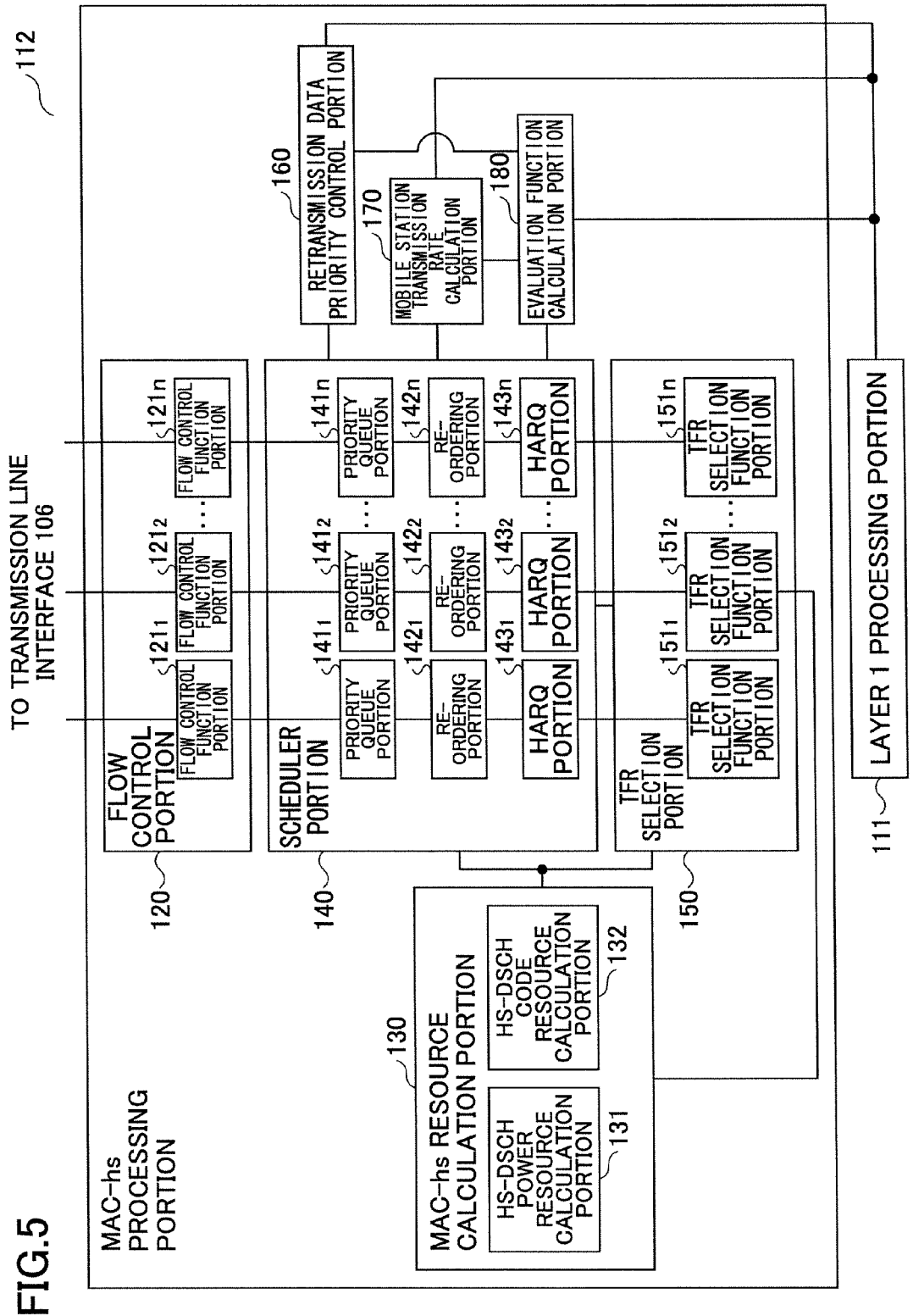
FIG. 5 is a block diagram illustrating an MAC-hs processing portion of the radio base station according to the example of the present invention.

Next, the MAC-hs processing portion 112 is described in reference to FIG. 5.

The MAC-hs processing portion 112 includes a flow control portion 120 connected to the transmission line interface 106; a scheduler portion 140 connected to the flow control portion 120; and a MAC-hs resource calculation portion 130; a Transport Format and Resource (TFR) selection portion 150, a retransmission data priority control portion 160, a mobile station transmission rate calculation portion 170, and an evaluation function calculation portion 180, all of which are connected to the scheduler portion 140.

The retransmission data priority control portion 160, the mobile station transmission rate calculation portion 170, and the evaluation function calculation portion 180 are connected to the layer 1 processing portion 111. In addition, the evaluation function calculation portion 180 is connected to the retransmission data priority control portion 160 and the mobile station transmission rate control portion 170. Moreover, the MAC-hs resource calculation portion 130 is connected to the TFR selection portion 150.

The flow control portion 120 includes flow control function portions $121_1$, $121_2$, ..., $121_n$ connected to the transmission line interface 106.

The scheduler portion 140 includes priority queue portions $141_1$, $141_2$, ..., $141_n$ connected to the corresponding flow control function portions $121_1$, $121_2$, ..., $121_n$, re-ordering portions $142_1$, $142_2$, ..., $142_n$ connected to the corresponding priority queue portions $141_1$, $141_2$, ..., $141_n$, and HARQ portions $143_1$, $143_2$, ..., $143_n$ connected to the corresponding re-ordering portions $142_1$, $142_2$, ..., $142_n$.

The TFR selection portion 150 includes TFR function portions $151_1$, $151_2$, ..., $151_n$ connected to the corresponding HARQ portions $143_1$, $143_2$, ..., $143_n$.

The MAC-hs resource calculation portion 130 includes an HS-DSCH power resource calculation portion 131 and an HS-DSCH code resource calculation portion 132.

In the flow control portion 120, each of the flow control function portions $121_1$, $121_2$, ..., $121_n$ controls a transmission rate of a signal received from the radio control apparatus via the transmission line interface 106 in accordance with the capacity of buffers provided or the like. Each of the flow control function portions $121_1$, $121_2$, ..., $121_n$ monitors and controls the traffic volume of the packets, for example, so as to reduce an outgoing traffic volume of the transmission packets when the traffic increases so that an available memory of queue buffers decreases.

Specifically, each of the flow control function portions $121_1$, $121_2$, ..., $121_n$ decreases the outgoing traffic volume when the available memory of the queue buffers becomes a predetermined threshold.

In the MAC-hs resource calculation portion 130, the HS-DSCH power resource calculation portion 131 and the HS-DSCH code resource calculation portion 132 calculate radio resources (power resource, code resource, hardware resource, or the like) assigned to the HS-DSCH.

The scheduler portion 140 is described in detail. The priority queue portions $141_1$, $141_2$, ..., $141_n$ are provided for every connection. While one priority queue portion is generally assigned to one user, plural priority queue portions may be assigned to the user when one user has plural connections. Downlink data are input into the priority queue portions $141_1$, $141_2$, ..., $141_n$ and stored therein until selected by the scheduling.

In the re-ordering portions $142_1$, $142_2$, ..., $142_n$, a sequence number is given to the data so that the mobile station n can perform downlink reception order control in the retransmission control in the HARQ portions $143_1$, $143_2$, ..., $143_n$, and window control is performed to prevent a reception buffer of the mobile station from overflowing.

The HARQ portions $143_1$, $143_2$, ..., $143_n$ perform retransmission control based on uplink Ack/Nack feedback in accordance with the Stop-and-Wait protocol of M processes.

Next, operations in the HARQ portions $143_1$, $143_2$, ..., $143_n$ are described with reference to FIG. 6.

The HARQ portions $143_1$, $143_2$, ..., $143_n$ perform a process in accordance in the Stop-and-Wait protocol of, for example, 6 processes.

In the Stop-and-Wait protocol ARQ, a receiver sends a transmission acknowledgement (Ack/Nack) to a transmitter upon reception of a packet from the transmitter. Here, the transmitter receives and decodes the transmission acknowledgement to determine whether the reception result in the receiver is OK or NG (namely, Ack or Nack), which takes a predetermined process time.

Figure 6:
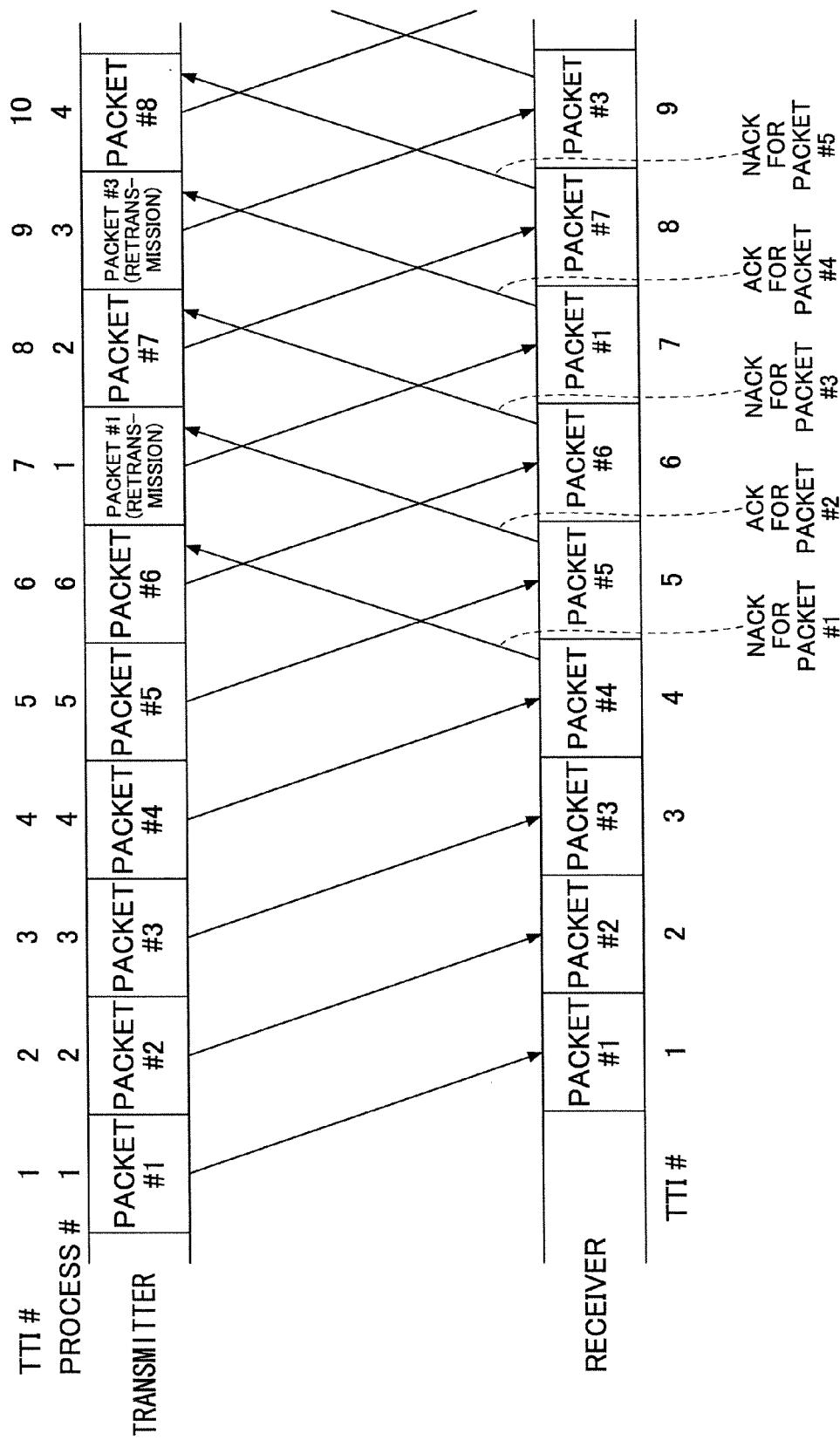
FIG. 6 is an explanatory view of an example of operations of the Stop-and-Wait Protocol employed in a HARQ portion.

In FIG. 6, when the receiver receives a packet #1, the receiver sends a negative acknowledgement (Nack) to the transmitter since the reception is not correctly received. In addition, since a packet #2 is correctly received, the receiver sends a positive acknowledgement (Ack) to the transmitter. The receiver repeats the operations of sending back Ack or Nack for the transmitter in response to subsequent packet reception.

In the TFR (Transport Format and Resource) selection portion 150, the TFR selection function portions $151_1$, $151_2$, ..., $151_n$ determine a downlink transmission format (data size, the number of codes, the number of modulation variables, coding rate) and transmission power in accordance with the CQI (channel Quality Indicator), which is an indicator of downlink quality of a signal received through uplink, and the radio resources (power resource, code resource, hardware resource) assigned to the HS-DSCH calculated by the MAC-hs resource calculation portion 130, or the like. The TFR selection portion 150 notifies the layer 1 process portion 111 of the determined downlink transmission format and transmission power of the downlink transmission channel.

The retransmission data priority control portion 160 determines presence/absence of the retransmission data in the mobile station n. In addition, the retransmission data priority control portion 160 generates a function D(RETXn) having as an argument the determination result RETXn of the presence/absence of the retransmission data. The retransmission data priority control portion 160 notifies the evaluation function calculation portion 180 of the RETXn and the function D(RETXn).

For example, the retransmission data priority control portion 160 sets the function D(RETXn) as:

D(0)=1.0

D(1)=2.0, where RETXn=0 means there are no retransmission data; and RETXn=1 means there are retransmission data, which increase an assigning probability, namely, priority, to the mobile station n having retransmission data. Therefore, the packet assignment is preferentially performed on the mobile station n having the retransmission data.

In addition, the retransmission priority control portion 160 may set the function D(RETXn) as:

D(0)=1.0

D(1)=1000.0, where RETXn=0 means there are no retransmission data; and RETXn=1 means there are retransmission data, which increase an assigning probability, namely, priority, to the mobile station n having the retransmission data. Therefore, the packet assignment is highly preferentially performed on the mobile station n having the retransmission data.

Namely, adjustment of the function D(RETXn) allows for adjustment of a degree of the priority in the retransmission data.

By the way, the function D(RETXn) may be determined in accordance with a type of service, contract, receiver, cell, or priority class regarding the data in the priority queue portion $141_1$, $141_2$, ..., $141_n$. Here, the type of receiver may be, for example, a RAKE receiver, an equalizer, a reception diversity receiver, an interference chancellor, and UE Capability (class indicator due to a receivable modulation method, the number of receivable codes, the number of receivable bits), or the like.

By the way, when data have been mapped at least once in the HS-DSCH and transmitted to the mobile station concerned, when Ack to the data is not received from the mobile station through the uplink HSDPA control channel HS-DPCCH, and when the elapsed time from the previous transmission becomes a predetermined time or more, the data are retransmission data. And "elapsed time from the previous transmission is a predetermined time or more" means that the elapsed time from the previous transmission is, for example, 6 TTIs (Transmission Time Interval) or more in FIG. 6.

Namely, the packet #1 is determined to be retransmission data since the packet #1 is transmitted at TTI=1, the acknowledgement for the packet #1 is not Ack but Nack at TTI=7, and 6 TTIs or more have passed since the packet #1 has been previously transmitted at TTI=1, while the packet #1 is not the retransmission data during TTIs=2 to 6.

The mobile station transmission rate calculation portion 170 calculates an average transmission rate of the mobile station n in accordance with the expression (1):

$$\overline{R}_n(t) = \delta \cdot \overline{R}_n(t-1) + (1-\delta) \quad (1)$$

$\overline{R}_n$: average transmission rate of mobile station n

In the expression (1), δ is a parameter designating an averaging interval, in other words, a forgetting factor (0=<δ=<1). The parameter δ may be determined in accordance with a type of service, contract, receiver, cell, or priority class regarding the data in the priority queue portion $141_1, 141_2, \ldots, 141_n$. Here, the type of receiver may be, for example, a RAKE receiver, an equalizer, a reception diversity receiver, an interference chancellor, and UE Capability (class indicator due to a receivable modulation method, the number of receivable codes, the number of receivable bits), or the like.

In addition, $r_n$ in the expression (1) represents an instantaneous transmission rate. The mobile station transmission rate calculation portion 170 determines to be a data transmission rate (instantaneous data transmission rate) one of a data size (for example, data volume) of the data whose acknowledgement is confirmed, a data size (for example, data volume) of the data that have been transmitted, and a data size (for example, data volume) of transmittable data estimated from radio quality or instantaneous radio quality reported from the mobile station n.

Five examples of update opportunities where the average transmission rate is updated for the mobile station n, which are obtained in accordance with the expression (1), are as shown in Table 1.

TABLE 1

| type# | $\overline{R}_n$ Update Opportunity | $r_n$ calculation method |
|---|---|---|
| 1 | Every TTI during connection | Size of data whose acknowledgement is confirmed |
| 2 | Every TTI during connection | Size of data transmitted |
| 3 | Every TTI during connection | Same as $R_n$ |
| 4 | Every TTI during which scheduling factor is calculated | Size of data whose acknowledgement is confirmed |
| 5 | Every TTI during which scheduling factor is calculated | Size of data transmitted |

Example of combination of the update opportunities and the average transmission rate of the mobile station Here, the average transmission rate of the mobile station n may have a broader meaning of radio quality. Namely, the radio quality may be a transmission rate, a Channel Quality Indicator (CQI) reported from the mobile station, a downlink SIR, or a transmittable data size estimated from CQI and SIR.

Namely, the data size (for example, data volume) of the data whose acknowledgement is ensured and the data size (for example, data volume) that has been transmitted correspond to the transmission rate. Similarly, the data size (for example, data volume) of transmittable data estimated from radio quality or instantaneous radio quality reported from the mobile station n corresponds to the data size of the transmittable data estimated from at least one of the CQI and the SIR.

By the way, in order to obtain the average transmission rate of the mobile station n without relying on the above methods, the MAC-hs processing portion 112 may have a function of measuring a data transmission rate in a data link layer. When such a function is provided, the MAC-hs processing portion 112 measures the data volume incoming to the MAC-hs processing portion 112 at every predetermined period of time after the mobile station n becomes ready for data communications. In addition, the MAC-hs processing portion 112 may determine to be the data transmission rate (average data transmission rate) the measured data volume per the predetermined period of time.

The evaluation function calculation portion 180 calculates an evaluation function for every mobile station, the evaluation function being used in scheduling in the scheduler portion 140. The scheduler portion 140 selects the mobile station n having the largest evaluation function value among the evaluation function values calculated by the evaluation function calculation portion 180, and assigns the downlink shared channel to the mobile station n (performs the downlink transmission assignment).

In addition, the layer 1 processing portion 111 described in reference to FIG. 4 receives information indicating downlink radio quality reported through the uplink HSDPA dedicated physical channel from each mobile station and outputs the information to the evaluation function calculation portion 180. Here, the information indicating the downlink radio quality may be instantaneous received Signal-to-Interference (SIR), Bit Error Rate (BER), Channel Quality Indicator, or the like.

Figure 7:
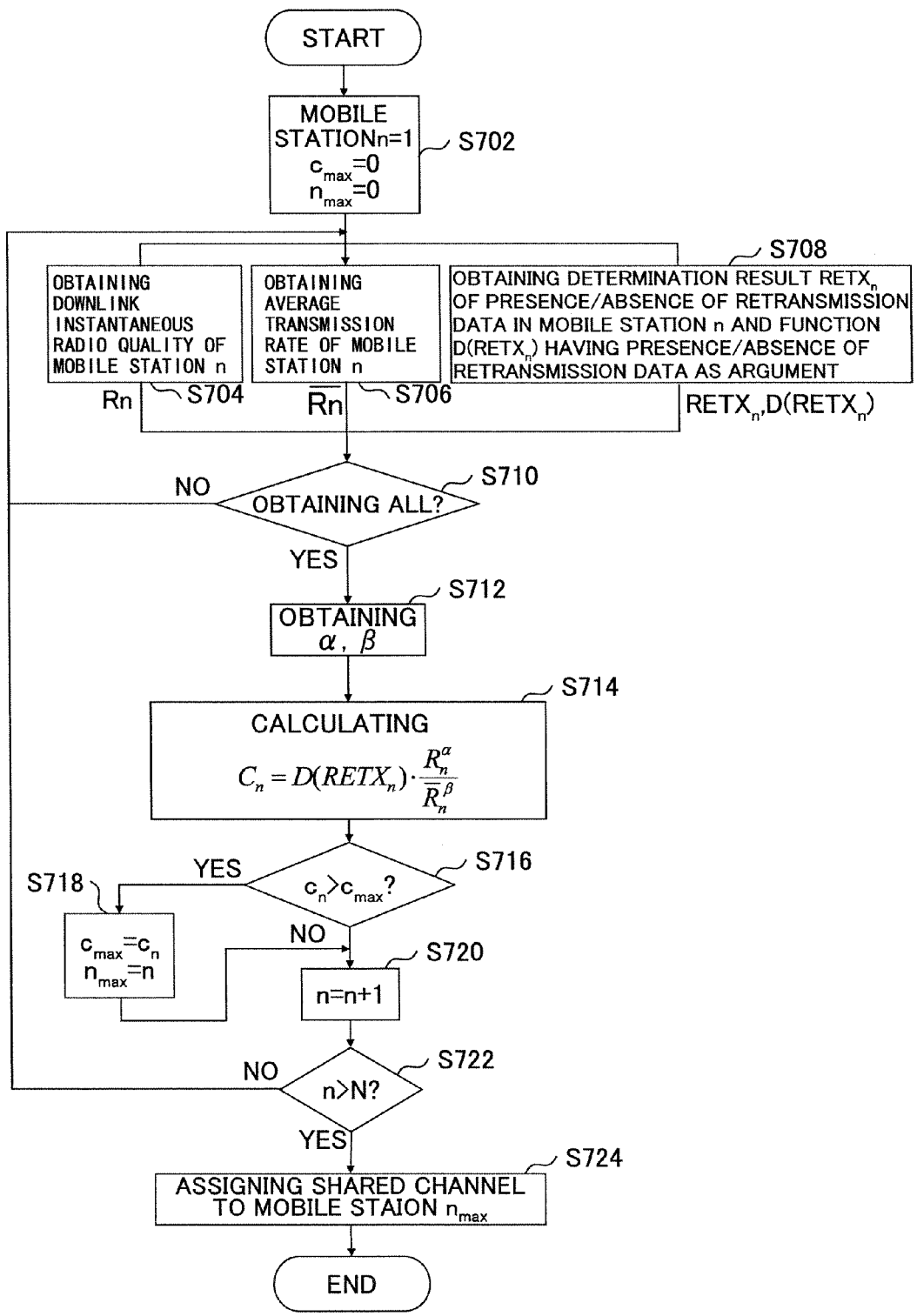
FIG. 7 is a flowchart illustrating scheduling operations in the MAC-hs processing portion according to an example of the present invention.

Next, scheduling operations according to this example are described in reference to FIG. 7.

In FIG. 7, the evaluation function calculation portion 180 of the MAC-hs processing portion 112 performs initialization for calculating the evaluation function of the mobile station n (step S702).

For example, n=1, $C_{max}=0$, and $n_{max}=0$ are set as initial values.

Here, n represents a mobile station suffix; $C_{max}$ represents the maximum value of the evaluation function; and $n_{max}$ represents the mobile station having the maximum value of the evaluation function.

Next, information used for calculating the evaluation function $C_n$ is obtained, as specifically described hereinafter.

The evaluation function calculation portion 180 obtains one of the data size (for example, data volume) of transmittable data estimated from radio quality and the data size (for example, data volume) of transmittable data estimated from instantaneous radio quality reported from the mobile station n (step S704). Here, "the data size of transmittable data estimated from radio quality" is defined as a data size that is estimated to be transmittable at a predetermined error rate in accordance with a radio transmission resource in the HS-DSCH calculated in the MAC-hs resource calculation portion 130 and the instantaneous SIR or the CQI indicating the downlink quality.

In addition, the evaluation function calculation portion 180 obtains the average transmission rate of the mobile station n, which is input from the mobile station transmission rate calculation portion 170 (step S706).

Moreover, the evaluation function calculation portion 180 obtains the determination result RETXn of the presence/absence of the retransmission data in the mobile station n, and the function D(RETXn) having the above RETXn as an argument, which are input from the retransmission priority control portion 160 (step S708).

Next, the evaluation function calculation portion 180 determines whether all the above information is obtained (step S710).

When it is determined that all the information is obtained (step S710: YES), the evaluation function calculation portion 180 obtains index parameters (α, β) remotely designated via the call processing portion 105 (step S712).

On the other hand, when it is determined that there is information that has not been obtained yet (step S710: NO), the process flow returns to at least one of the steps S704, S706, and S708 and thus the evaluation function calculation portion 180 obtains the lacking information.

Next, the evaluation function calculation portion 180 calculates the evaluation function ($C_n$) in accordance with the expression (2) (step S714).

$$C_n = D(RETX_n) \cdot \frac{R_n^\alpha}{\overline{R_n}^\beta} \qquad (2)$$

$R_n$: downlink instantaneous radio quality of mobile station n $\overline{R_n}$: average transmission rate of mobile station n Here, there is described an evaluation function at step S714 obtained by adding the function D(RETXn) that controls the retransmission data priority to the Proportional Fairness evaluation function.

When the mobile station n has retransmission data the value of D(RETXn) becomes larger, whereas when the mobile station n has no transmission data the value of D(RETXn) becomes smaller. Therefore, the packet assignment method can be adaptively controlled in accordance with the presence/absence of the retransmission data. As a result, a packet can be assigned to the retransmission data, which prevents the retransmission data from remaining untransmitted and errors from occurring in upper layers, such as the RLC layer and the TCP layer.

Here, the function D(RETXn) that controls the priority of the retransmission data is remotely designated, for example, by an upper node of the radio base station 100, for example, a radio transmission control apparatus or a server over a core network. For example, the function D(RETXn) is included in a call processing control signal and provided to the radio base station 100 from the upper node.

The radio base station 100 receives in the call processing portion 105 the function D(RETXn) that controls the priority of the retransmission data, the function being included in the call processing control signal, and forwards the function D(RETXn) to the retransmission priority control portion 160 of the MAC-hs processing portion 112 in the base band signal processing portion 104.

In addition, the radio base station 100 may store as internal data of the radio base station 100 the function D(RETXn) that controls the priority of the retransmission data, and the retransmission priority control portion 160 of the MAC-hs processing portion 112 in the base band signal processing portion 104 may refer to the function D(RETXn) stored as the internal data.

Moreover, the remotely designated radio parameters α and β are changeable. Appropriate setting of these values α and β can provide a scheduler somewhere between a so-called Proportional Fairness scheduler (α=1, β=1) and an MAX C/I scheduler ((α=1, β≈1 (but β≠0)).

By the way, the evaluation function is not limited to the aforementioned expression but optionally changeable. For example, part of the evaluation function $C_n$ may be replaced with the expression (3).

$$\frac{R_n^\alpha}{\overline{R_n}^\beta} \qquad (3)$$

$R_n$: downlink instantaneous radio quality of mobile station n $\overline{R_n}$: average transmission rate of mobile station n In addition, in the case of a scheduler whose evaluation function is, for example, expressed by the expression (4), to this function is added a function D(RETXn) that controls the priority of the retransmission data and thus the evaluation function as a whole may be expressed by the expression (5). Here, α, β, and γ represent parameter coefficients from 0 to 1; and $W_n$ represents a latency time of a packet of the mobile station n in the radio base station.

$$C_n = \frac{R_n^\beta}{\overline{R_n}^\alpha} \cdot W_n^\gamma \qquad (4)$$

$$C_n = D(RETX_n) \cdot \frac{R_n^\beta}{\overline{R_n}^\alpha} \cdot W_n^\gamma \qquad (5)$$

Namely, any function obtained by adding to an evaluation function a function having as an argument the RETXn indicating the determined result of the presence/absence of the retransmission data may be used as an evaluation function.

After the evaluation function $C_n$ is calculated at step S714, it is determined whether the calculated evaluation function $C_n$ is the maximum value, namely, $C_n > C_{max}$ (step S716).

When the evaluation function $C_n$ is the maximum value (step S716: YES), $C_{max}$ and $n_{max}$ are updated as $C_{max} = C_n$ and $n_{max} = n$, respectively (step S718). Here, since $C_{max}$ is set as 0 (initial value), $C_n$ is larger than $C_{max}$. Therefore, the evaluation function $C_n$ calculated at step S714 is set as $C_{max}$, and the mobile station n designated by this $C_{max}$ is set as the mobile station $n_{max}$.

When the evaluation function $C_n$ is not the maximum value (step S716: NO), or after the process at step S718 is performed, the n of the mobile station n is incremented in order to calculate the evaluation function of the next mobile station (step S720).

Next, it is determined whether the mobile station n exceeds the number (N) of the mobile stations that are communicating with the radio base station (step S722).

When it is not determined that the mobile station n exceeds the number (N) of the mobile stations that are communicating with the radio base station (step S722: NO), a loop process at step S704 and beyond is repeated until the number of the mobile stations n is determined to exceed the number (N). Namely, the evaluation functions $C_n$ of all the mobile stations communicating with the radio base station are calculated.

On the other hand, when it is determined that the mobile station n exceeds the number (N) of the mobile stations communicating with the radio base station (step S722: YES), the scheduler portion 140 is instructed to assign the downlink shared channel (HS-DSCH) to the mobile station $n_{max}$ so set at step S718 (step S724).

According to this example described above, it becomes possible to preferentially assign packets to the mobile station having retransmission data. As a result, the retransmission data can be prevented from remaining and errors that may take place in the upper layer can be reduced.

Although the above explanation has been made in a situation where one user has one priority queue, one user can have plural priority queues, for example, K priority queues. In this case, the above scheduling is performed for N×K priority queues instead of N priority queues.

By the way, the evaluation function calculation portion 180 and the retransmission data priority control portion 160 of the MAC-hs processing portion 112 are composed of, for example, a CPU and a Digital Signal Processor (DSP), or a programmable device such as FPGA or the like in which a program of the aforementioned evaluation function is stored in a predetermined memory area and the parameters ($\alpha$, $\beta$, $\delta$, and D(RETXn)) can be downloaded and rewritten. In this case, the parameters ($\alpha$, $\beta$, $\delta$, and D(RETXn)) may be downloaded from the upper node of the radio base station 100. Or, the retransmission data priority control portion 160 and the evaluation function calculation portion 180 are provided with a terminal I/F (an exterior interface function), from which the parameters ($\alpha$, $\beta$, $\delta$, and D(RETXn)) may be directly read.

In addition, each function block of the MAC-hs processing portion 112 may be separated by hardware, or by software in a program on the processor.

In addition, although this example is described about the High Speed-Downlink Packet Access in 3GPP, the example is not limited to HSDPA but applicable to high speed packet transmission methods in other mobile communications systems in which downlink packet transmission control (scheduling) is performed. The high-speed packet transmission method includes, for example, a cdma 2000 1xEV-DO method in 3GPP, a TDD method in 3GPP, and a high speed packet transmission method in Long Term Evolution (Super 3G).

Moreover, the functions of the retransmission data priority control portion 160, the mobile station transmission rate calculation portion 170, and the layer 1 processing portion 111 correspond to a function of a state comprehending portion, and the function of the evaluation function calculation portion 180 corresponds to a function of a radio terminal selection portion, in this example.

Furthermore, the radio base station 100 corresponds to a packet transmission control apparatus, and the mobile stations 10, 11, 12 correspond to a radio terminal.

Figure 8:
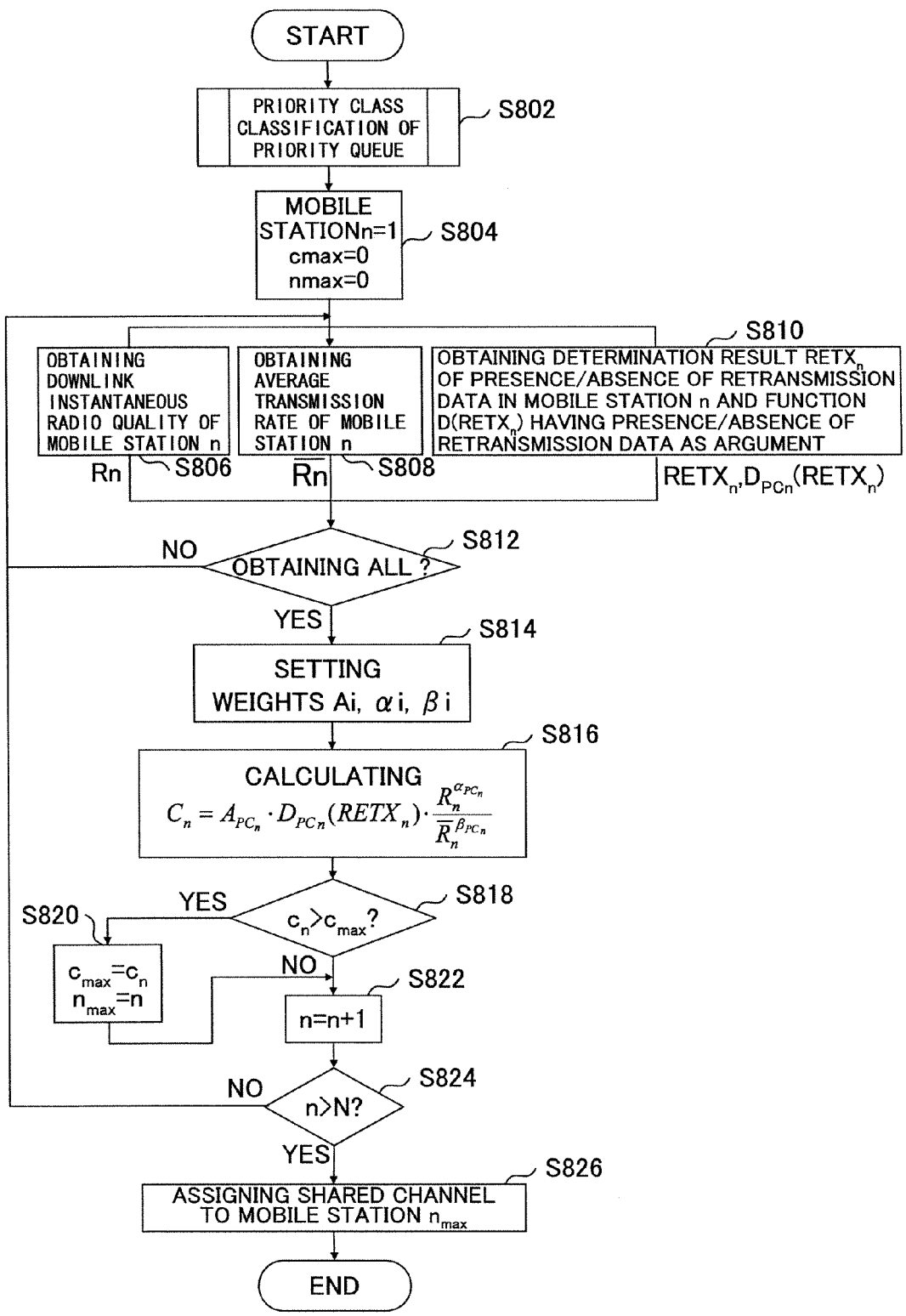
FIG. 8 is a flowchart illustrating scheduling operations in the MAC-hs processing portion according to an example of the present invention.

Next, a second example according to the present invention is described in reference to FIG. 8.

In packet transmission in a packet communications network, it has been contemplated that two types of priority classes are provided and a packet having a first priority is more preferentially transmitted than a packet having a second priority (see patent-related document 1, for example).

A radio base station according to this example is different in the operations of the MAC-hs processing portion 112 from the radio base station according to the first example.

In this example, plural priority classes are defined and packet scheduling is performed according to the priority classes.

The evaluation function calculation portion 180 of the MAC-hs processing portion 112 classifies the aforementioned priority queue portions 1411, 1412, . . . , 141n into several priority classes and so predefines (step S802).

Next, initialization is performed in order to calculate the evaluation function $C_n$ Of the mobile station n (step S804). For example, n=1, $C_{max}$=0, and $n_{max}$=0 are set as initial values.

Then, in the same manner as the first example, information used to calculate the evaluation function $C_n$ is obtained, as specifically described hereinafter.

The evaluation function calculation portion 180 obtains one of the data size (for example, data volume) of transmittable data estimated from radio quality and the data size (for example, data volume) of transmittable data estimated from instantaneous downlink radio quality of the mobile station n input from the layer 1 processing portion 111 (step S806).

In addition, the evaluation function calculation portion 180 obtains an average transmission rate in the mobile station n input from the mobile station transmission rate calculation portion 170 (step S808).

Moreover, the evaluation function calculation portion 180 obtains the determination result RETXn of the presence/absence of the retransmission data in the mobile station n and the function D(RETXn) having the RETXn as an argument, both of which are input from the retransmission data priority control portion 160 (step S810).

Next, the evaluation function calculation portion 180 determines whether all the aforementioned information is obtained (step S812).

When it is determined that all the information is obtained (step S812: YES), the evaluation function calculation portion 180 receives the index parameters ($\alpha_i$, $\beta_i$, $\delta_i$) designated remotely via the call processing portion 105 and a weighing factor $A_i$ given to each priority class (step S814). Here, the "i" is a suffix of the priority level of mobile stations.

On the other hand, when it is determined that there is information that has not yet been obtained (step S812: NO), the process flow returns to at least one of steps S806, S808, and S810 and the evaluation function calculation portion 180 obtains the lacking information.

Next, the evaluation function calculation portion 180 calculates the evaluation function ($C_n$) in accordance with the expression (6), where PCn represents the priority class of a mobile station n focused. (step S816).

$$C_n = A_{PC_n} \cdot D_{PC_n}(RETX_n) \cdot \frac{R_n^{\alpha PC_n}}{\overline{R_n}^{\beta PC_n}} \quad (6)$$

$R_n$: downlink instantaneous radio quality of mobile station n $\overline{R_n}$: average transmission rate of mobile station n In the expression (6), when two priority classes are provided so that i($PC_n$)=1 is defined for the upper priority class of the two classes and i($PC_n$)=2 is defined for the lower priority class, $A_1$ is set to be greater than $A_2$ and thus packets in the mobile station whose priority class is higher are preferentially transmitted. Namely, by setting the difference between $A_1$ and $A_2$ to be sufficiently large, data having higher priority are always preferentially transmitted. In addition, when RETXn is set as 1 for the presence of retransmission data and RETXn is set as 0 for the absence of retransmission data, $D_1$ and $D_2$ are set as follows: $D_1$(RETXn=1)=1000.0, $D_1$(RETXn=0)= 1.0, $D_2$(RETXn=1)=2.0, and $D_2$ (RETXn=0)=1.0. With this, the priority of the retransmission data in the higher priority class can be set to be extremely large, and the priority of the retransmission data in the lower priority class can be set to be marginally large. Namely, by combining the weighing factor Ai given to each priority class and $D_{PCn}$(RETXn) that sets the retransmission data priority, there is provided a packet assignment method that enables detailed control of packet assignment frequencies in accordance with the priority classes and the presence/absence of the retransmission data.

Moreover, by setting the index parameters ($\alpha_1$, $\beta_1$) and ($\alpha_2$, $\beta_2$) as (1, 1) and (1, 0), respectively, high priority data can be dealt with by the Proportional Fairness scheduler and low priority data can be dealt with by the MAC C/I scheduler.

When the evaluation function $C_n$ is calculated at step S816, it is determined whether the calculated evaluation function $C_n$ is the maximum value, namely, whether $C_n$ is greater than $C_{max}$ (step S818).

When the evaluation function $C_n$ is the maximum value (step S818: YES), $C_{max}$ and $n_{max}$ are set as $C_{max}=C_n$ and $n_{max}=n$, respectively (step S820). Here, since $C_{max}$ is set as 0 (initial value), $C_n$ is greater than $C_{max}$. Therefore, the evaluation function $C_n$ calculated at step S816 is set as $C_{max}$ and the mobile station n designated by this $C_{max}$ is set as the mobile station $n_{max}$.

When the evaluation function $C_n$ does not take the maximum value (step S818: NO), or after the process at step S820 is performed, the n of the mobile station n is incremented in order to calculate the evaluation function of the next mobile station (step S822).

Next, it is determined whether the n of the mobile station n exceeds the number (N) of mobile stations that are communicating with the radio base station (step S824).

When it is not determined that the n of the mobile station n exceeds the number (N) of the mobile stations that are communicating with the radio base station (step S824: NO), a loop process at step S806 and beyond is repeated until the mobile station n is determined to exceed the number (N). Namely, the evaluation functions $C_n$ of all the mobile stations communicating with the radio base station are calculated.

On the other hand, when it is determined that the mobile station n exceeds the number (N) of the mobile stations communicating with the radio base station (step S824: YES), the scheduler portion 140 is instructed to assign the downlink shared channel (HS-DSCH) to the mobile station $n_{max}$ so set at step S816 (step S826).

According to this example described above, not only the indexes $\alpha_i$, $\beta_i$, $\delta_i$ and the factor Ai depending on the priority class but also the scheduling in accordance with the presence/absence of the retransmission data in each mobile station can be controlled, thereby realizing an appropriate scheduler that operates in accordance with the priority classes and the presence/absence of the retransmission data in each mobile station.

In addition, the evaluation function is not limited to the aforementioned expression but optionally changed in this example. Namely, any function having RETXn indicating the determination result of the presence/absence of the retransmission data can be added to any form of an evaluation function so as to be used as the evaluation function of this example.

Moreover, although this example has been explained in conjunction with the High Speed-Downlink Packet Access (HSDPA), this example is applicable to any other high speed packet transmission method accompanying the downlink packet transmission control (scheduling) in the mobile communications system. For example, cdma 2000 1xEV-DO according to 3GPP2, a TDD method according to 3GPP, a high speed packet transmission method according to Long Term Evolution (Super 3G), or the like may be cited.

In this example, the retransmission data priority control portion 160 corresponds to the retransmission data priority control portion; the mobile station transmission rate calculation portion 170 and the layer 1 processing portion 111 correspond to the state comprehending portion; and the evaluation function calculation portion 180 corresponds to the evaluation function calculation portion, the class setting portion, the priority class setting portion, and the radio terminal selection portion. Moreover, the exterior interface function of the evaluation function calculation portion 180 corresponds to a function of the exterior setting portion.

Furthermore, the radio base station 100 corresponds to the packet transmission control apparatus and the mobile stations 10, 11, 12 correspond to the radio terminal in this example.

Figure 9:
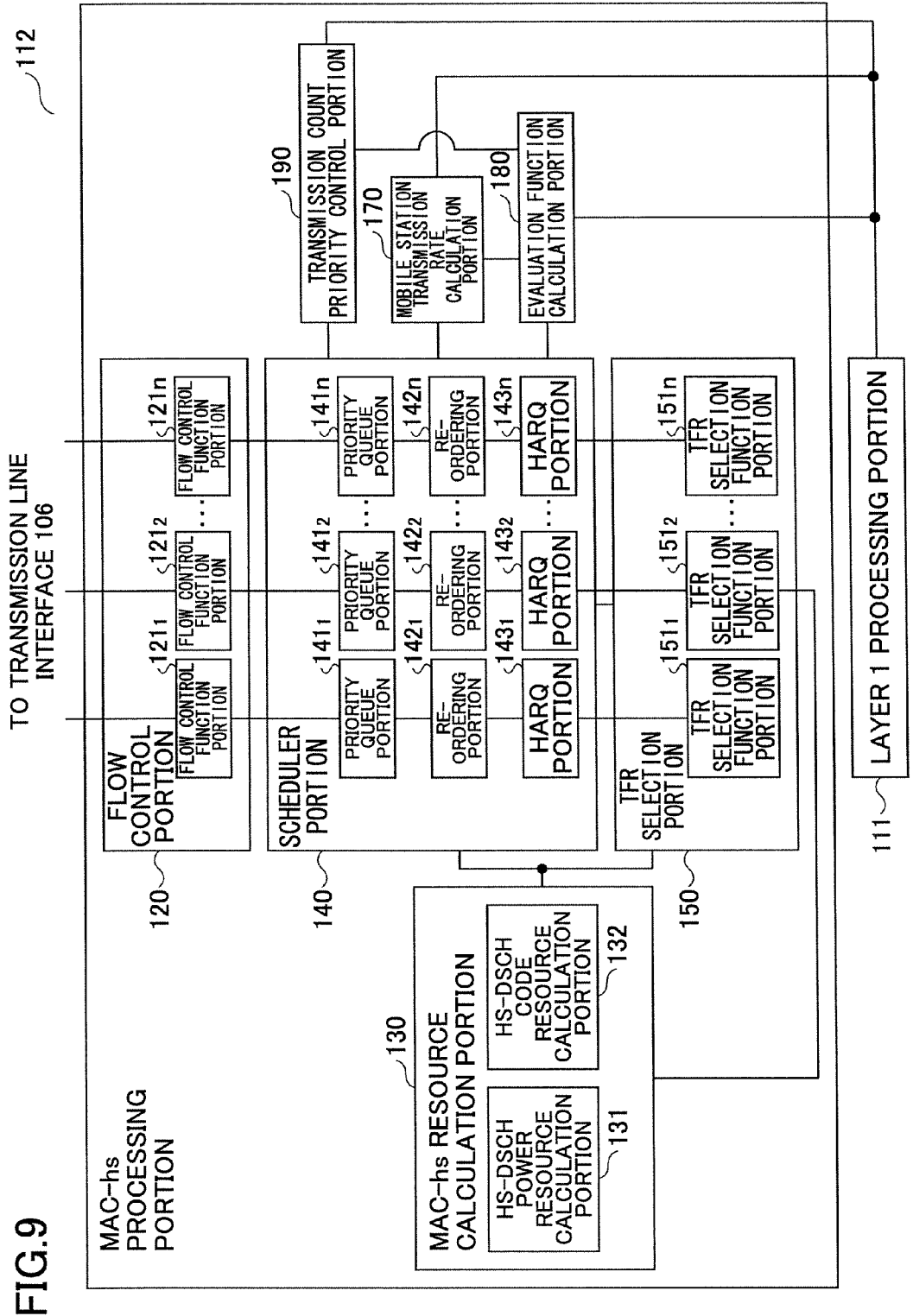
FIG. 9 is a block diagram illustrating an MAC-hs processing portion in the radio base station according to an example of the present invention.
Figure 10:
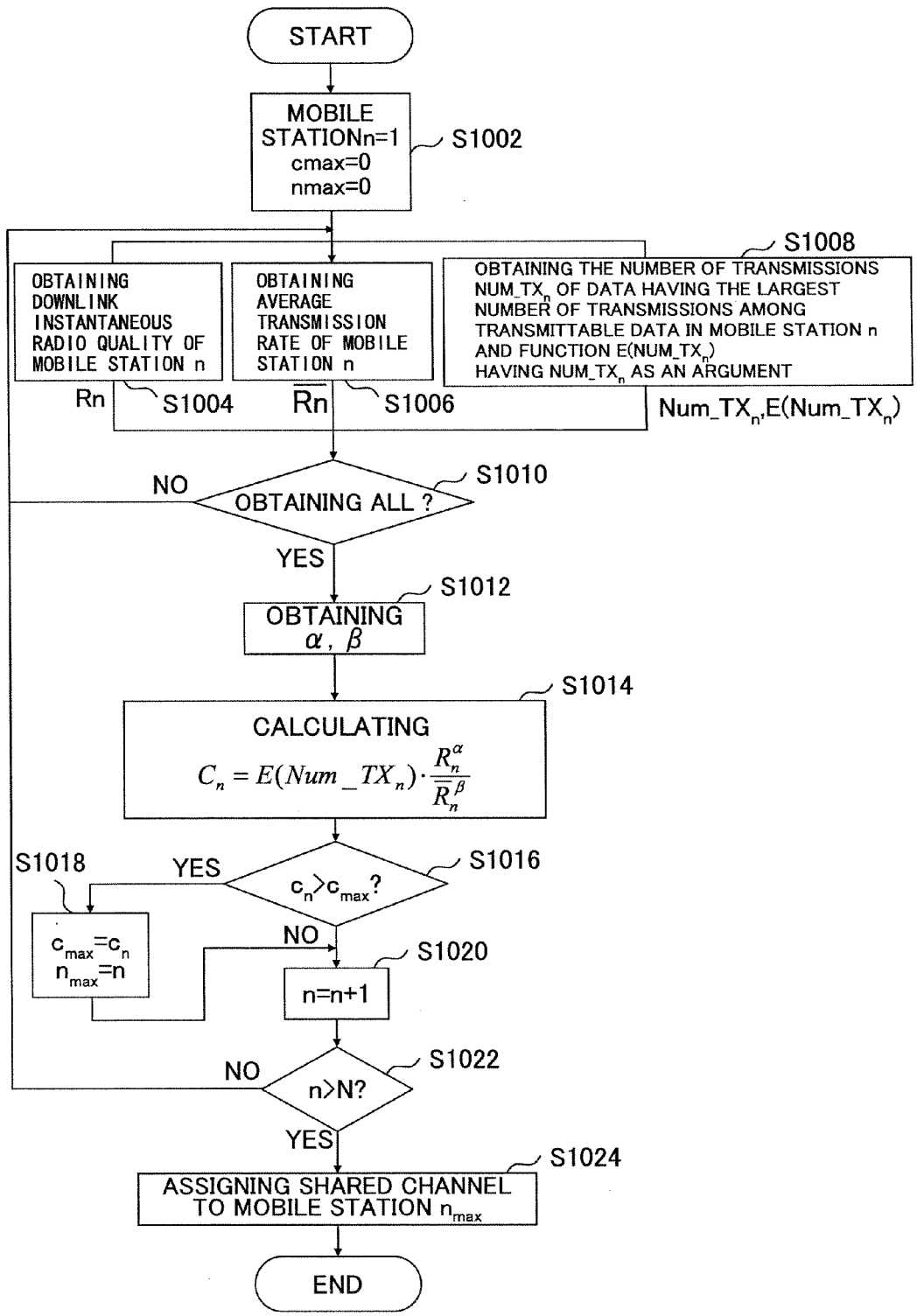
FIG. 10 is a flowchart illustrating scheduling operations in the MAC-hs processing portion according to an example of the present invention.

Next, a third example of the present invention is described in reference to FIGS. 9 and 10.

In the previously described examples, the function D(RETXn) having as an argument RETXn indicating the presence/absence of the retransmission data in the mobile station n is added to the Proportional Fairness evaluation function $C_n$; and the packet assignment frequencies are controlled depending on the presence/absence of the retransmission data.

In a radio base station according to this example, not the function D(RETXn) having as an argument RETXn indicating the presence/absence of the retransmission data in the mobile station n but a function E(Num_TXn) having as an argument the number of data transmissions is added to the Proportional Fairness evaluation function $C_n$, thereby enabling control of the packet assignment frequencies depending on the number of data transmissions.

As shown in FIG. 9, the radio base station according to this example includes a transmission count priority control portion 190 instead of the retransmission data priority control portion 160, and is different in this respect from the radio base station described in reference to FIG. 5.

The transmission count priority control portion 190 is described below.

The transmission count priority control portion 190 notifies the evaluation function calculation portion 180 of the number of transmissions of the datum having the largest number of transmissions among transmittable data in the mobile station n, as Num_TXn.

In the case of a first transmission, Num_TXn is 1, which naturally means the first transmission. Also, in the case of the fourth transmission (third retransmission), Num_TXn=4. In addition, a function E(Num_TXn) having the number of transmissions Num_TXn as an argument is generated and the function E(Num_TXn) is imparted to the evaluation function calculation portion 180.

For example, the transmission count priority control portion 190 sets the function E(Num_TXn) as E(1)=1.0, E(2)=2.0, E(3)=4.0, and E(4)=7.0. In this case, as the number of transmissions is increased, the priority becomes higher, which enables preferential assignment of packets to a mobile station having a larger number of transmissions (transmission count).

Namely, use of the function E (Num_TXn) enables priority control in accordance with the number of transmissions.

By the way, the function E(Num_TXn) may be determined in accordance with a type of service, contract, receiver, cell, or priority class regarding the data in the priority queue portion $141_1, 141_2, \ldots, 141_n$. Here, the type of receiver may be, for example, a RAKE receiver, an equalizer, a reception diversity receiver, an interference chancellor, and UE Capability (class indicator due to a receivable modulation method, the number of receivable codes, the number of receivable bits), or the like.

Next, scheduling operations according to this example are described in reference to FIG. 10.

The evaluation function calculation portion 180 of the MAC-hs processing portion 112 sets initial values for calculating the evaluation function of the mobile station n (step S1002). For example, the initial values may be set as n=1, $C_{max}=0$, and $n_{max}=0$. Here, n indicates a mobile station; $C_{max}$ indicates the maximum value of the evaluation function; and $n_{max}$ indicates the mobile station having the maximum evaluation function.

Next, information used to calculate the evaluation function Cn is obtained, as specifically described in the following.

The evaluation function calculation portion 180 obtains one of the data size (for example, data volume) of transmittable data estimated from radio quality and the data size (for example, data volume) of transmittable data estimated from instantaneous radio quality reported from the mobile station n (step S1004). Here, "the data size of transmittable data estimated from radio quality" is defined as a data size that is estimated to be transmittable at a predetermined error rate in accordance with a radio transmission resource in the HS-DSCH calculated in the MAC-hs resource calculation portion 130 and the CQI indicating the downlink quality or the instantaneous SIR in the downlink transmission channel.

In addition, the evaluation function calculation portion 180 obtains an average transmission rate of the mobile station n output from the mobile station transmission rate calculation portion 170 (step S1006).

Moreover, the evaluation function calculation portion 180 obtains the number of data transmissions Num_TXn of the datum having the largest number of data transmissions among all the transmittable data in the mobile station n, and the function E(Num_TXn) having as an argument the number of data transmission Num_TXn (step S1008).

Next, the evaluation function calculation portion 180 determines whether all the aforementioned information is obtained (step S1010).

When it is determined that all the information is obtained (step S1010: YES), the evaluation function calculation portion 180 obtains the index parameters ($\alpha$, $\beta$) designated remotely via the call processing portion 105 (step S1012).

On the other hand, when it is determined that there is information that has not yet been obtained (step S1010: NO), the process flow returns to at least one of steps S1004, S1006, and S1008 and the evaluation function calculation portion 180 obtains the lacking information.

Next, the evaluation function calculation portion 180 calculates the evaluation function (Cn) in accordance with the expression (7) (step S1014).

$$C_n = E(\text{Num\_TX}_n) \cdot \frac{R_n^\alpha}{\overline{R_n}^\beta} \quad (7)$$

$R_n$: downlink instantaneous radio quality of mobile station n $\overline{R_n}$: average transmission rate of mobile station n In the following, operations at step S1014 are described in which the function E(Num_TXn) that controls the priority in accordance with the number of data transmissions is added to the Proportional Fairness evaluation function.

Namely, E(Num_TXn) contributes to the evaluation function Cn in accordance with the number of transmissions of the transmittable data in the mobile station n concerned, which enables an adaptive packet assignment in accordance with the number of data transmissions. As a result, since the value of E(Num_TXn) becomes larger when the number of data transmissions is large, a packet can be preferentially assigned to the data having the large number of data transmissions, thereby preventing the data having the large number of data transmissions from remaining untransmitted and errors from occurring in the upper layers, namely the RLC layer and the TCP layer.

By the way, the processes at step S1016 and beyond are the same as described in the previous examples and the repetitive explanations are omitted.

In addition, the evaluation function is not limited to the exemplified expression but may be optionally changed. Any evaluation function may be used if a function having as an argument the number of data transmissions Num_TXn of the datum having the largest number of data transmissions among all the transmittable data is added thereto.

Moreover, although this example has been explained in conjunction with the High Speed-Downlink Packet Access (HSDPA), this example is applicable to any other high speed packet transmission method accompanying the downlink packet transmission control (scheduling) in the mobile communications system. For example, cdma 2000 1xEV-DO according to 3GPP2, a TDD method according to 3GPP, a high speed packet transmission method according to Long Term Evolution (Super 3G), or the like can be cited as the high speed packet transmission method.

According to the examples described above, a packet assignment probability to the mobile station can be controlled in accordance with the presence/absence of the retransmission data and the number of data transmissions, thereby preventing the retransmission data from remaining untransmitted in the lower layer. As a result, errors that may take place in the upper layers, for example, the RLC layer and the TCP layer can be reduced, and an upper layer quality can be improved.

In addition, although there have been described situations where the priority is determined in accordance with the presence/absence of the retransmission data and where the priority is determined in accordance with the number of data transmissions in the examples of the present invention, the priority may be determined in accordance with both the presence/absence of the retransmission data and the number of data transmissions.

Moreover, similar to the second example described above of the present invention, where the priority is determined in accordance with the priority classes and the presence/absence of the retransmission data, the priority may be determined in accordance with the priority classes and the number of data transmissions.

This international patent application is based on Japanese Priority Application No. 2005-119015, filed on Apr. 15, 2005, with the Japanese Patent Office, the entire contents of which are hereby incorporated by reference.

INDUSTRIAL APPLICABILITY

A packet transmission control apparatus and a packet transmission control method according to the present invention are applicable to a mobile communications system.

The invention claimed is:

1. A packet transmission control apparatus that controls packet transmission to plural radio terminals, the apparatus comprising:
   a state obtaining portion that obtains an instantaneous radio quality and an average radio quality of each radio terminal;
   a first priority adjustment function generating portion that generates a function of adjusting a priority so that the priority is higher as a number of data transmissions is increased;
   a second priority adjustment function generating portion that generates a Proportional Fairness scheduling algorithm function having as an argument at least one of the instantaneous radio quality and the average radio quality of each radio terminal obtained by the state obtaining portion;

an evaluation function calculation portion that calculates an evaluation function including the function of adjusting the priority generated by the first priority adjustment function generating portion, and the function generated by the second priority adjustment function generating portion; and a radio terminal selection portion that selects a radio terminal that is to be a communications party in accordance with the evaluation function calculated by the evaluation function calculation portion and allocates a downlink shared channel to the selected radio terminal.

2. The packet transmission control apparatus of claim 1, further comprising:

a transmission count determination portion that determines the number of data transmissions in each radio terminal, wherein the first priority adjustment function generating portion generates the function having as an argument the number of data transmissions determined by the transmission count determination portion.

3. The packet transmission control apparatus of claim 2, further comprising:

a class setting portion that sets plural priority classes, wherein the evaluation function calculation portion calculates the evaluation function including the function generated by the first priority adjustment function generating portion, the evaluation function being set for each of the priority classes.

4. The packet transmission control apparatus of claim 1, wherein the state obtaining portion obtains as the average radio quality at least one of an average transmission rate of each radio terminal, an average value of a downlink SIR of each radio terminal, and an average value of a radio quality provided through uplink by each radio terminal.

5. A packet transmission control method that controls a packet transmission to plural radio terminals, the method comprising the steps of:

obtaining an instantaneous radio quality and an average radio quality of each radio terminal;

determining a number of data transmissions for each of the radio terminals;

generating a first function of adjusting a priority so that the priority is higher as the number of data transmissions is increased;

generating a second Proportional Fairness scheduling algorithm function having as an argument at least one of the instantaneous radio quality and the average radio quality of each radio terminal;

calculating an evaluation function including the first function and the second function; and selecting a radio terminal that is to be a communications party in accordance with the evaluation function calculated in the calculating step and allocating a downlink shared channel to the selected radio terminal.

6. The packet transmission method of claim 5, wherein generating a first function comprises generating the first function having as an argument the number of data transmissions.

7. The packet transmission control apparatus of claim 1, further comprising:

a third priority adjustment function generating portion that generates a function of adjusting a priority of retransmission data in accordance with presence/absence of retransmission data, wherein the evaluation function calculation portion calculates the evaluation function including the function of adjusting the priority generated by the third priority adjustment function generating portion, and the radio terminal selection portion selects the radio terminal that is to be a communications party in accordance with the evaluation function calculated by the evaluation function calculation portion.

8. The packet transmission control apparatus of claim 7, further comprising:

a retransmission data determination portion that determines the presence/absence of retransmission data in each radio terminal, wherein the second priority adjustment function generating portion generates the function having as an argument the determination result of the presence/absence of the retransmission data determined by the retransmission data determination portion.

9. The packet transmission control apparatus of claim 8, further comprising:

a class setting portion that sets plural priority classes, wherein the evaluation function calculation portion calculates the evaluation function including the function generated by the third priority adjustment function generating portion, the evaluation function being set for each of the priority classes.

10. The packet transmission control apparatus of claim 7, wherein the second priority adjustment function generating portion generates the function in which the priority is set higher in the case of the presence of retransmission data than in the case of no retransmission data.

11. The packet transmission control method of claim 5, further comprising the steps of:

determining presence/absence of retransmission data; and generating a third function of adjusting a priority of retransmission data in accordance with the presence/absence of retransmission data wherein, the calculating step comprises evaluation function including the third function, and the selecting step comprises selecting the radio terminal that is to be a communications party in accordance with the evaluation function calculated in the calculating step.

12. The packet transmission control method of claim 11, wherein the step of generating the third function comprises generating the function having as an argument the determination result of the presence/absence of the retransmission data.

13. The packet transmission control apparatus of claim 1, wherein the first priority adjustment function generating portion, the evaluation function calculation portion and the radio terminal selection portion are implemented by one or more processors.

* * * * *